United States Patent [19]
Hirata

[11] 3,761,166
[45] Sept. 25, 1973

[54] OVERLAP PHOTOGRAPHING DEVICE IN A CINECAMERA

[75] Inventor: Hiroshi Hirata, Sakai, Japan

[73] Assignee: Minolta Camera Co., Ltd., Osaka-fu, Japan

[22] Filed: Nov. 27, 1972

[21] Appl. No.: 309,716

Related U.S. Application Data

[63] Continuation of Ser. No. 96,183, Dec. 8, 1970, abandoned.

[30] Foreign Application Priority Data
Dec. 9, 1969  Japan.............................. 44/116327
Jan. 1, 1970  Japan................................ 45/8920

[52] U.S. Cl. ................................................. 352/91
[51] Int. Cl. ............................................ G03b 21/36
[58] Field of Search............................. 352/91, 217

[56] References Cited
UNITED STATES PATENTS

| | | | |
|---|---|---|---|
| 3,246,944 | 4/1966 | Winkler | 352/91 |
| 2,117,694 | 5/1938 | Becker | 352/217 |
| 3,567,316 | 3/1971 | Wilharm | 352/91 |
| 3,582,198 | 6/1971 | Reinsch | 352/91 |
| 3,545,852 | 12/1970 | Winkler et al. | 352/91 |
| 3,606,529 | 9/1971 | Reinsch et al. | 352/91 |
| 3,617,118 | 11/1971 | Muller | 352/91 |

Primary Examiner—Samuel S. Matthews
Assistant Examiner—Russell E. Adams, Jr.
Attorney—Lawrence R. Radanovic

[57] ABSTRACT

The present invention is intended to effect automatically an overlap photographing in a cinecamera by operating a single change-over operation member, and an overlap photographing device in a cinecamera in accordance with the present invention comprises a camera driving member driven by a motor, a clutch interposed between a time set up member and a shutter opening operation plate and interlocked with a change-over operation member, and a switch for changing over the normal-reverse rotation of the motor operated by the shutter operation plate and said time set up member, and whereby in the normal photographing, by operating the change-over operation member the fade-out photographing in a certain length and the rewinding film in the same length are automatically carried out and stopped, and by restoring said change-over operation member the fade-in photographing in the same length film and the subsequent normal photographing are carried out.

6 Claims, 13 Drawing Figures

FIG. 1

PATENTED SEP 25 1973  3,761,166

INVENTOR

Hiroshi Hirata

BY Watson, Cole, Grindle & Watson
ATTORNEY

INVENTOR
Hiroshi Hirata
BY Watson, Cole, Grindle & Watson
ATTORNEY

OVERLAP PHOTOGRAPHING DEVICE IN A CINECAMERA

This is a continuation of application Ser. No. 96,183, filed Dec. 8, 1970, now abandoned.

The present invention relates to an overlap photographing device in a cinecamera and more particularly to an overlap photographing device in a cinecamera, wherein by operating the single operation member the fade-out photographing in a certain film length and the subsequent rewinding film in the same length are automatically carried out and stopped, and by restoring said operation member the fade-in photographing in the same length film and the subsequent normal photographing are automatically carried out.

BACKGROUND OF THE INVENTION

In the overlap photographing in the prior cinecamera, the fade-out photographing is carried out making use of the shutter opening, and the film length is read by a film counter and the rewinding the same length film is read in the same way by the film counter, and further the fade-in photographing in the same length film length is read by the film counter, therefore, while in photographing the camera man must read the film counter as a rule catching an object in the finder so that it is troublesome and he is required to be trained up and accordingly the overlap photographing ends often in failure.

Therefore, the automation of overlap photographing is now in being tried, however, the mechanism thereof becomes complicate and the operation is not reliable.

THE OBJECT OF THE INVENTION

One object of the present invention is to provide an overlap photographing device in a cinecamera, which by operating a single change-over operation member effects the fade-out photographing in a certain length and the rewinding film in the same length film automatically, and by restoring said change-over operation member effects the fade-in photographing on the film on which the fade-out photographing is carried out and the subsequent normal photographing automatically.

Another object of the present invention is to provide an overlap photographing device in a cinecamera, which by means of change-over operation member, a camera driving member driven by a motor, a clutch having relation to said change-over operation member, a time set up member for interlocking said camera driving member in the normal and reverse direction through said clutch, a shutter opening operation plate, and a normal-reverse rotation change-over switch for said motor operated by said time set up member, effects and stops the fade-out photographing in a certain length and the rewinding film in the same length film automatically, and by restoring the change-over operation member effects the fade-in photographing on said film which fade-out photographing is carried out and the subsequent normal photographing automatically.

Further another object of the present invention is to provide an overlap photographing device in a cinecamera, which is provided with a safety device for checking the operation of the change-over operation plate in the high speed photographing.

The other objects of the present invention will be cleared from the description of the embodiment disclosed hereinafter.

SUMMARY OF THE INVENTION

In order to attain the aforementioned objects, the present invention relates to an overlap photographing device in a cinecamera, which is so formed that by means of a change-over operation member, a camera driving member driven by a motor, a clutch for changing over to the first position and the second position in relation to said change-over operation member and having relation to said camera driving member, a time set up member and a shutter opening operation plate for engaging with said clutch, and a normal-reverse rotation change over switch for said motor operated by said time set up member, said time set up member and said shutter opening operation plate do not engage with said camera driving member for normally rotating in the normal photographing, and said clutch changed over to the second position by the operation of said change-over operation member drives said time set up member and said shutter opening operation member in interlocking with said camera driving member for normally rotating so as to effect the fade-out photographing; and when said time set up member changes over said change-over switch to the reverse rotation side, said clutch located on the second position interlocks with the camera driving member for reversely rotating and engages only with the time set up member to restore said time set up member and at its final stroke to open the breaking switch so as to rewind the film; and by restoring said change over operation member said change-over switch is changed over to the normal rotation side and to the same time said clutch is changed to the first position and said clutch for interlocking with the camera driving member for normally rotating engages with the shutter opening operation plate to effect the fade-in photographing and at its final stroke to release said engagement so as to effect the normal photographing in succession.

DESCRIPTION OF THE PREFERRED EMBODIMENT:

In the first embodiment shown in FIGS. from 1 to 10 in accordance with the present invention, the change over operation member is composed of cam 1 fixed eccentrically to change-over knob spindle 1' and operation plate 2 provided with projection 3 for engaging with said cam 1 and supported movably up and down by a guide slot on the camera body base plate, in which a guide pin fits. And said operation plate 2 is given the descending tendency by spring 10 provided between pin 8 thereof and pin 9 provided fixedly on the base plate and said projection 3 is pressed into contact with cam 1.

From said operation plate 2 arm 4 having pin 5 is projected and said pin 5 engages with movable contact piece 7 of change-over switch 6.

On clutch lever 11 there are pivoted four gears 14, 15, 16, 17 for meshing with each other, and said clutch lever 11 is supported rotatably on said base plate by spindle 15' of gear 15. Between pin 12 and pin 8 on said operation plate 2 there is provided spring 13 to be given the tendency to be located on the first position. By the way, numerals 18, 19 are respectively a stop pin for regulating the turning of gear lever 11.

Driving shaft 21 driven by prime mover 20 shown in FIG. 3, FIG. 5, FIG. 7 and FIG. 9 meshes with said gear 15 through worm shaft 22 and at the same time is connected frictionally to film takeing up shaft 24 through gear 23.

Figure 10:
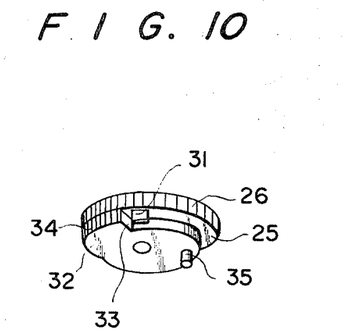
FIG. 10 is a perspective view of a gear for the shutter opening operation plate and the time set up member.

Time set up plate 25 forming toothless gear 26 extending over about a semicircle to constitute a time set up member fits rotatably on spindle 28 by means of boss 27 and said toothless gear 26 is engageable with the second clutch gear 17, depending upon the turning position, on the second position of said clutch in accordance with the turning of clutch lever 11. On the top face of said time set up plate projections 29, 30 are provided nearly at the center of the toothed portion and nearly at the center of toothless portion symmetrically to its spindle, and on the back face projection 31 is formed as shown in FIG. 10, which is engageable with stepped portion 33 provided on shutter opening operation plate 32 pivoted on the back face of spindle 28. For said shutter opening operation plate 32 pin 35 is provided on its back face, and said pin 35 fits in slot 37 provided on one end of shutter opening operation lever 36 as shown in FIG. 1 and working piece 38 engages with spindle 39 through a connection rod, and diaphragm blade 40 is provided putting upon shutter blade 41 through a helicoid mechanism by means of said pin 39.

And, on shutter opening operation plate 32, as shown in FIG. 10 there is formed through stepped portion 33 sector wheel 34 having the same diameter as toothless gear 26 of said time set up plate 25 and the opening angle of about one-half of said toothless gear 26.

Switch holding lever 42 connected rotatably on boss 27 of said time set up plate 25 by a pin is provided on its tip with restraining portion 43 for engaging with movable contact piece 7 of change-over switch 6 and given the counter-clockwise turning tendency by weak spring 44.

Figure 1:
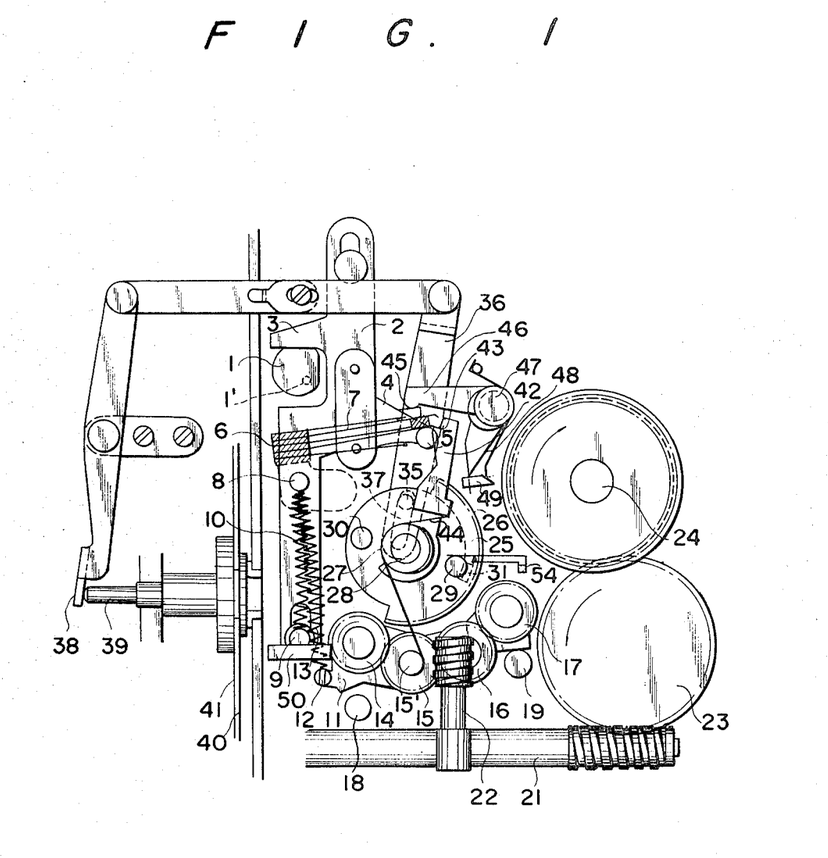
FIG. 1 is a side view showing the formation of the essential portion in the normal photographing in the embodiment in accordance with the present invention.

On projection 4 of said operation plate 2, restraining face 45 is formed as shown in FIG. 1, and with said restraining face 45 one arm of taking up shaft restraining lever 46 fitted loosely on spindle 47 and given the counter-clockwise turning tendency by spring 48 engages, and restraining pawl 49 formed on the other arm is made so as to be engageable with the film winding gear depending upon the turning of said lever 46.

And, on the lower end of operation plate 2 bent portion 50 is formed, and said bent portion 5D is made so as to engage with pin 12 of clutch lever 11 to change over it to the second position when said operation plate 2 descends.

Figure 8:
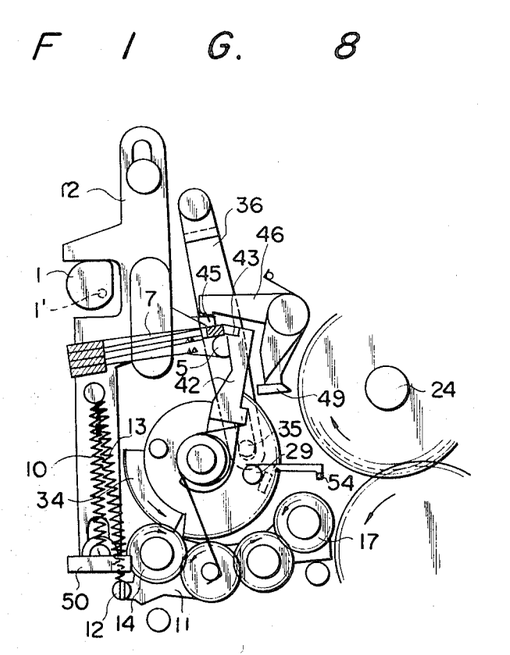
FIG. 8 is a side view showing the formation of the essential portion in the state wherein the change-over operation member is restored.
Figure 9:
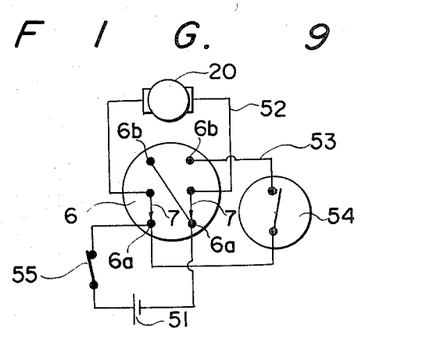
FIG. 9 is a circuit diagram in said state.

In FIG. 3, FIG. 5, FIG. 7, and FIG. 9, power source 51 and power switch 55 are changed over to contact 6a and contact 6b side by movable contact piece 7 of change-over switch 6, and when changed over to contact 6a side normal rotation circuit 52 is connected and when changed over to contact 6b side reverse rotation circuit 53 is connected, and in the reverse rotation circuit 53 there is connected breaking switch 54 given the ordinarily closing tendency. Said breaking switch 54 engages with projection 29 depending upon the position of time set up plate 25 to be opened as shown in FIG. 8.

Figure 3:
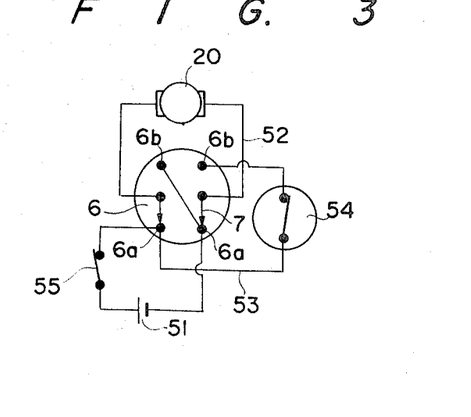
FIG. 3 is a circuit diagram in said state.

Since the present invention is formed as described above the operation is as follows:

(2) when carrying out the normal photographing, as shown in FIG. 1 operation plate 2 is pushed up against spring 10 by means of cam 1, and pin 5 ascends movable contact piece 7 of change-over switch 6 against its spring tendency to connect it to contact 6a for the normal rotation circuit as shown in FIG. 3, and said movable contact piece 7 engages with restraining portion 43 of switch holding lever 42. And, clutch lever 11 turns clockwise to take the first position through spring 13 and gear 14 is in the operational position meshable with toothless gear 26 and sector wheel 34, however, said toothless gear 26 and sector wheel 34 are in the terminal position of the counter-clockwise turning and these meshing is in being released. And, taking-up shaft restraining lever 46 is in the clockwise turning position against spring 48 by means of restraining face 45 located in the ascending position and restraining pawl 49 recedes from the gear of film taking-up shaft 24.

Therefore, when power switch 55 is closed by the release lever not shown in the drawings motor 20 normally rotates and shutter blade 41 turns along with diaphragm blade 40 and accordingly the normal photographing is effected.

Figure 2:
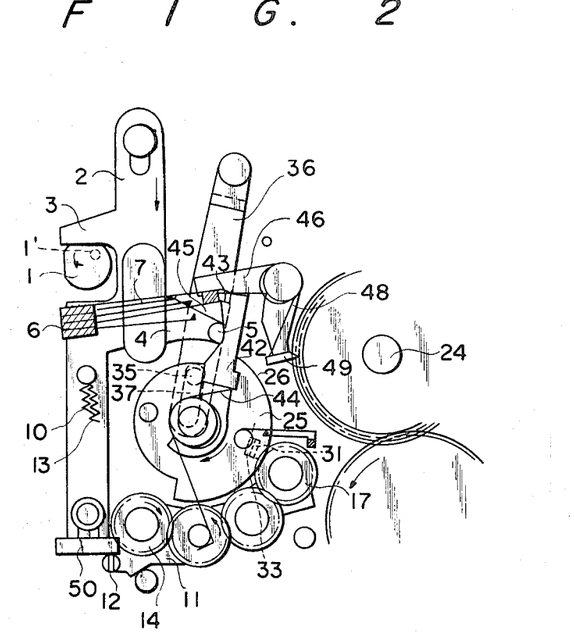
FIG. 2 is a side view showing the formation of the essential portion in the state changed over to the fade-out photographing by operating the change-over operation member in said embodiment.

(2) when carrying out the overlap photographing cam 1 is turned through 90° as shown in FIG. 2. In that case, operation plate 2 descends and pin 5 thereof stops the pushing up of movable contact piece 7, however, said movable contact piece 7 is restrained by restraining portion 43 of switch holding lever 42, so that the change-over switch is not changed over and stays in the original position, and accordingly motor 20 continues the normal rotation. And, on account of descending of said restraining face 45 restraining pawl 49 of taking up shaft restraining lever 46 restrains film winding gear 24 to check it from turning. On the other hand, bent portion 50 comes into contact with pin 12 to turn clutch lever 11 counter-clockwise to change over to the second position so that gear 14 of the first clutch recedes and gear 17 of the second clutch takes the operational position meshable with toothless gear 26 and second wheel 34.

Therefore, when power switch 55 is put in, gear 17 of second clutch turns counter-clockwise on account of the normal rotation of motor 20 and as the photographing goes on, time set up plate 25 and shutter opening operation plate 32 are turned clockwise. By the way, while in turning described above the meshing of sector wheel 34 and gear 17 of the second clutch is disconnected early, however, toothless gear 26 continues the meshing and its projection 31 pushes into contact with stepped portion 33 to turn together.

Figure 4:
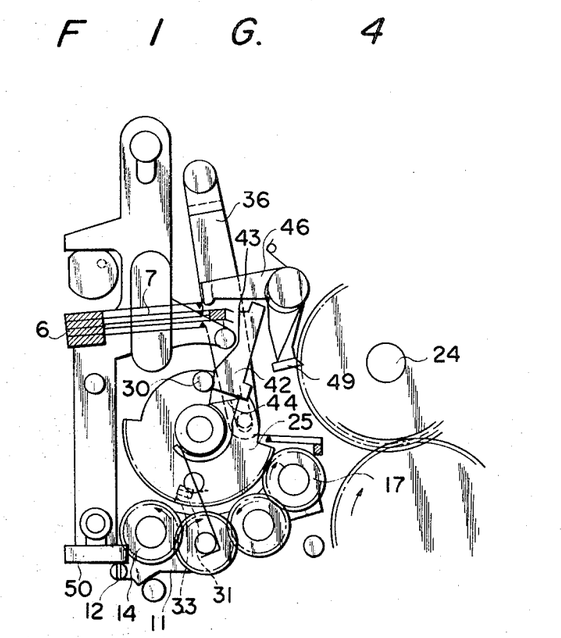
FIG. 4 is a side view showing the formation of the essential portion in the state changed over to the film rewinding state.
Figure 5:
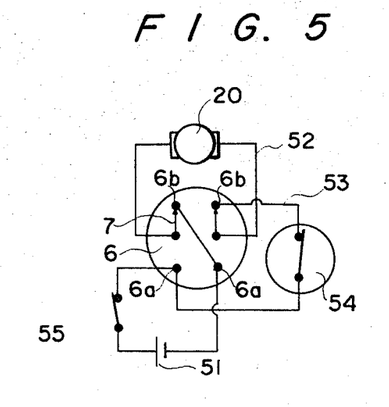
FIG. 5 is a circuit diagram in said state.
Figure 6:
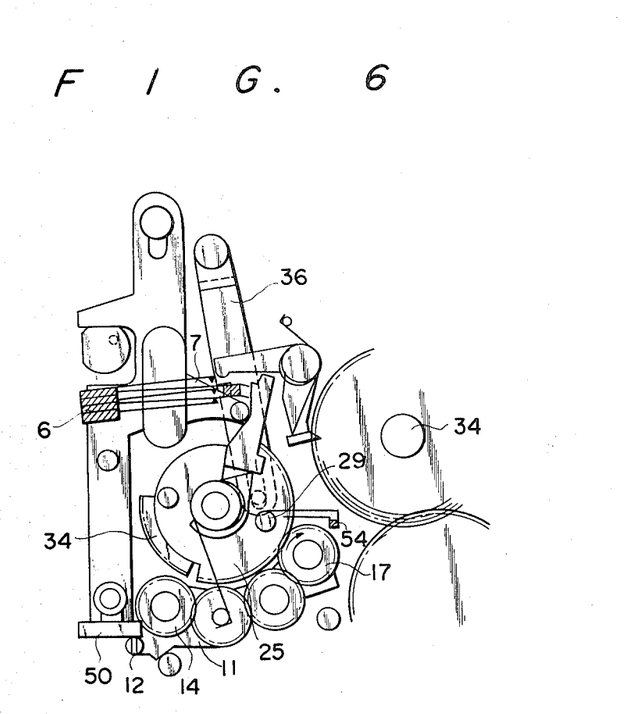
FIG. 6 is a side view showing the formation of the essential portion in the state at the time when the film rewinding is finished.
Figure 7:
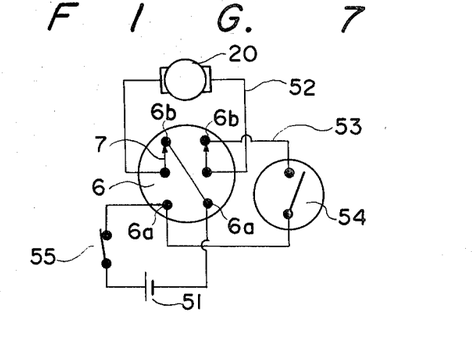
FIG. 7 is a circuit diagram in said state.

On account of said turning projection 35 pushes to move shutter opening operation lever 36 so as to shift the phase of shutter blade 41 and diaphragm blade 40 for turning to photograph and thereby the fade-out photographing is effected. And, on account of said shifting of the phase when the light rays incident to the objective lens are thoroughly shut off projection 30 of time set up plate 25 comes into contact with switch holding lever 42 to turn it clockwise against spring 44 and the engagement of said switch holding lever 42 and movable contact piece 7 is disconnected, so that said movable contact piece 7 descends through its spring force and change-over switch 6 is changed over from the contact 6a side to the contact 6b side, therefore, as shown in FIG. 4 and FIG. 5 the rewinding state is automatically effected and the rewinding of the film delivered in the fade-out photographing is started. That is, gear 17 of the second clutch is turned clockwise to turn to return time set up plate 25 counter-clockwise. In this case, sector wheel 34 of shutter opening operation plate 32 is in being disconnected from gear 17 of the second clutch so that it stays on that spot an only time set up plate 25 returns, therefore, the objective lens holds the state screened by shutter blade 41 and diaphragm blade 40 which phases are thoroughly shifted and accordingly the exposure to the film is prevented while in rewinding. And, when time set up plate 25 is returned to the initial start position its pin 29 comes into contact with breaking switch 54 to open it so that reverse rotation circuit 53 is shut off, and motor 20 is stopped, and thus the rewinding the film used in the fade-out photographing is finished to turn to the state shown in FIG. 6.

In the next place, upon catching the next object to overlap with said photograph and turning cam 1 again through 90°, operation plate 2 is pushed up so as to return, and its pin 5 pushes up the movable contact piece so as to change over switch 6 from contact 6b on the reverse rotation side to contact 6a on the normal rotation side and restraining portion 43 of switch holding plate 42 fits into the backside thereof to check it, and film taking up shaft restraining lever 46 is pushed up by restrain face 45 against spring 48 to turn clockwise, and its restraining pawl 49 releases film winding shaft 24 from restraining of turning, and as bent portion 50 ascends on clutch lever 11 is turned clockwise to take the first position by spring 13, gear 17 of the second clutch recedes, and gear 14 of the first clutch is moved to the operational position engageable with toothless gear 26 and sector wheel 34 to turn to the state shown in FIG. 8. In this case, as seen in FIG. 8 said toothless gear 26 has returned to the start position shown in FIG. 1 so that gear 14 of the first clutch does not mesh with toothless gear 26 but meshes only with sector wheel 34 as shown in FIG. 8. And, power switch is closed and the photographing is started, gear 14 of the first clutch is turned clockwise to turn to return sector wheel 34 counter-clockwise, and the shutter opening is gradually enlarged to effect the fade-in photographing. And, when the fade-in photographing is thoroughly overlapped with the film onto which the fade-out photographing is effected previously, the phases of shutter balde 41 and diaphragm blade 40 coincide with each other throughly and the shutter opening is fully opened, and at the same time sector wheel 34 is sent thoroughly counter-clockwise to disconnect from gear 14 of the first clutch and return to the state shown in FIG. 1 so as to effect the subsequent normal photographing.

Since the present invention is formed and operated as described above, without paying a special attention to the film counter the cameraman can carry out automatically the fade-out photographing only by closing the power switch, and rewind exactly the film, and in addition by operating the change-over switch only one time can carry out the subsequent fade-in photographing exactly in the same film length, therefore, the overlap photographing can be easily effected.

Figure 11:
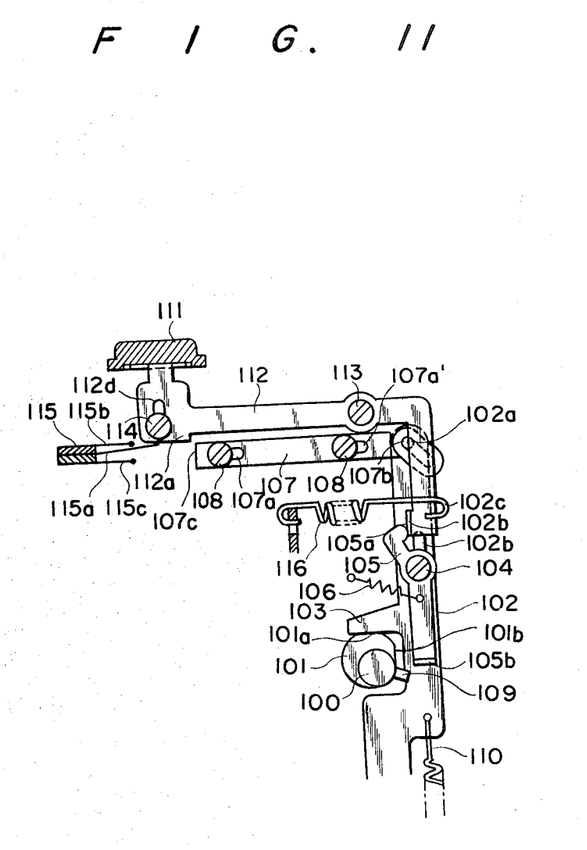
FIG. 11 is a partial side view of the essential portion in the normal photographing, showing the safety device for the change-over operation member and the shutter speed change member in another embodiment in accordance with the present invention.
Figure 12:
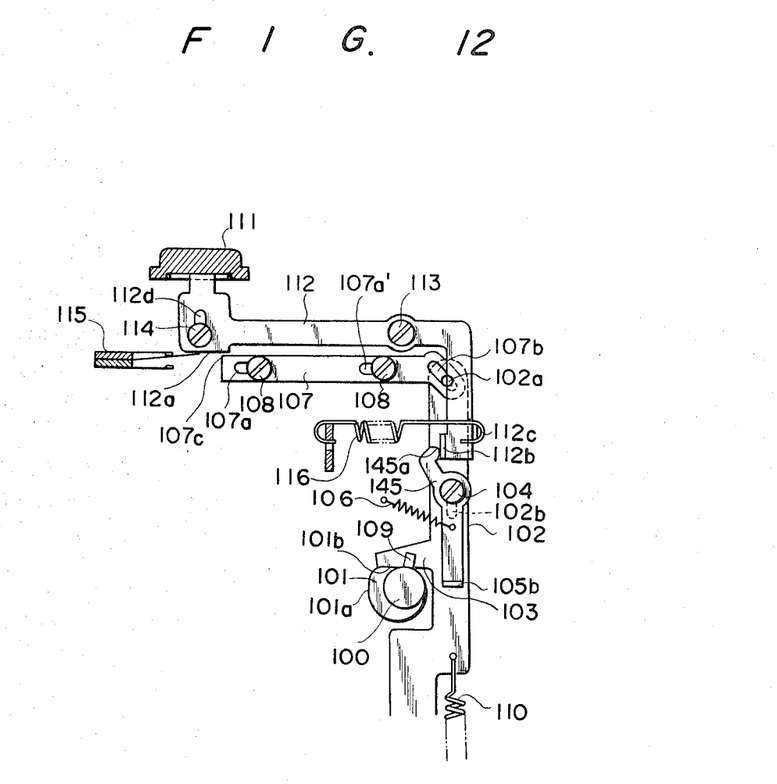
FIG. 12 is a side view in the overlap photographing in said embodiment.
Figure 13:
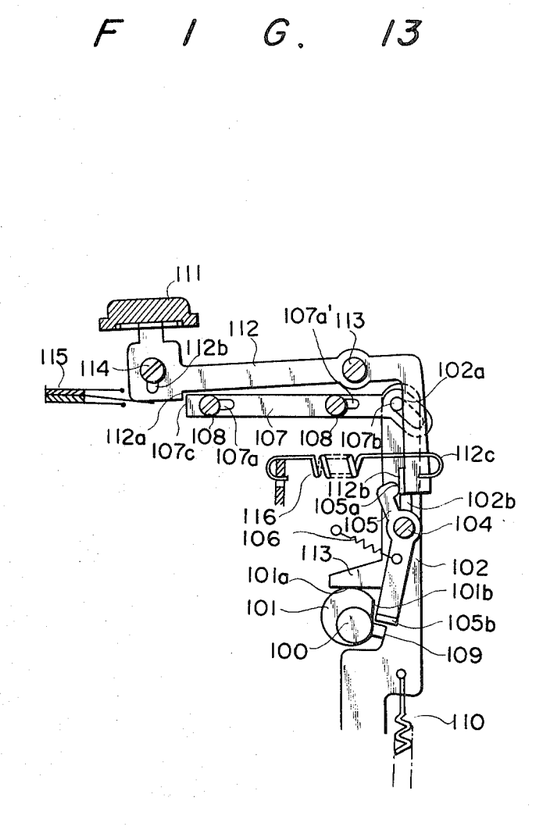
FIG. 13 is a side view in the high speed photographing in said embodiment.

FIGS. from 11 to 13 show the second embodiment in accordance with the present invention. In such a camera as the normal speed photographing and the high speed photographing are effected, when the change-over switch is changed over from the normal photographing to the overlap photographing just as the camera is put in the high speed side, or when the camera is put in the high speed side while in the overlap photographing in the normal speed, the inertia of all mechanisms at the time of the fade-out photographing, the film rewinding, or the fade-in photographing gets larger, especially at the time of the film rewinding, when the same length film as the film onto which the fade-out photographing is effected is rewound it is necessary to stop said rewinding, however, in this case even though the driving of motor 20 is stopped the inertia of the film feeding mechanism is applied to the film rewinding direction, and on the other side the remainder of film in the magazine on the film taking up side is gone, and in addition restraining pawl 49 engages with film winding shaft 24 to stop it, therefore, the force of inertia is applied directly to the perforations of the film and the film feeding pawl, and accordingly there is the possibility that the film is damaged or the film feeding pawl is broken.

Thereupon, in the second embodiment the safety device is provided in order that when the camera is set up to the high speed photographing side the changing over to the overlap photographing is checked and when changed over to the overlap photographing the setting up to the high speed photographing is checked.

In said FIGS. change-over cam 101 is fixed eccentrically to the spindle of change over knob 100 having restraining projection 109 and provided with contact face 101a for normal photographing in the larger diameter and contact face 101b for overlap photographing in the smaller diameter. And, with said change-over cam 101 projection 103 of change-over operation plate 102 pulled down by spring 110 comes into contact by means of guide slot 102b provided on said operation plate 102 and spindle pin 104 planted on the camera base plate.

Said operation plate 102 is provided with working pin 102a planted on the upper end thereof, an arm having a pin for engaging with the movable contact piece of the change switch in the same manner as in the first embodiment (not shown in the drawings), and a member coupled with the clutch lever.

Restraining lever 105 pivoted rotatably on said spindle pin 104 and given the clockwise turning tendency by spring 106 is provided on its one end with projection 105a and on its other end with restraining bent piece 105b for engaging with said restraining projection 109 of said change-over knob 100 to restrain it.

Sliding lever 107 provided with receiving slot 107 inclined at angles of about 45°, in which said pin 102a is fitted is provided with guide slots 107a, 107a' formed horizontally thereon and slidable to the right and left by means of guide pins 108, 108' planted on the base plate fitted in said guide slots 107a, 107a', and on the left end of said sliding lever 107 engage end edge 107c is formed.

Speed set up lever 112 in the L-shape pivoted on the base plate by spindle 113 is provided on the tip of its horizontal arm with speed set up push button 111 and turnable through a certain angle by means of slot 112d and pin 114 planted on the base plate fitted in said slot 112d, and the back face of said speed set up lever 112 engages with movable contact piece 115a of camera driving speed change over switch 115 and on the side face thereof engage corner angle portion 112a for engaging with engage end edge 107c of said sliding lever 107 is formed.

And, the vertical arm of said speed set up lever 112 is provided with restraining piece 112c and bent engage piece 112b for coming into contact with and engaging with projection 105a of said restraining lever 105, and between said restraining piece 112c and the base plate there is provided spring 116 for giving the clockwise turning tendency to said speed set up lever 112, and movable contact piece 115a is arranged to contact with contact 115b on the normal speed side away from contact 115c on the high speed side.

Now, as shown in FIG. 11, in the case of that the camera is set up for the normal speed side and change over operation knob 100 is changed over to the normal photographing it is possible to push the speed set up push button 111 as well and also to change over the change over operation knob 100 to the overlap photographing.

Thereupon, as shown in FIG. 12, upon pushing speed set up push button 111 speed set up lever 112 turns counter-clockwise against spring 116 and restraining lever 105 is turned clockwise by projection 105 for engaging with bent engage piece 112b, and restraining bent piece 105b thereof engages with restraining projection 109 of change-over operation knob 100 to restrain the counter-clockwise turning of said change-over operation knob 100 and accordingly the changing over from the normal photographing to the overlap photographing, and at the same time engage corner angle portion 112a to descend engages with engage end edge 107c of sliding lever 107 to prevent said sliding lever 107 from moving to the left.

Next, in the state shown in FIG. 11, upon turning change-over operation knob 100 counter-clockwise through about 90°, as shown in FIG. 13 operation plate 102 descends as much as the eccentric quantity of change-over cam 101 by means of spring 110 and its working pin 102a moves sliding lever 107 to the down side of engage corner angle portion 112a by means of receiving slot 107b to prevent speed set up push button 111 from being pushed in the high speed side.

Therefore, it is possible to perfectly prevent the overlap photographing under the high speed photographing or the setting up to the high speed photographing at the time when the change-over operation member is changed over to the overlap photographing side.

I claim:

1. In a motion picture camera, a combination comprising:

a reversible driving motor;

a change-over switch alternatively settable between a first position to drive said motor in a normal direction and a second position to drive said motor in a reverse direction;

a film transport means;

a transmission for transmitting rotation of said motor to said transport means;

a first interlocking means mechanically connected to said transmission to be driven by said motor and having a first gear and a second gear which are each mounted for rotation in opposite directions;

an operating member manually positionable to a first position for normal photography and to a second position for lap dissolve photography and provided with a switch control means for arresting said change-over switch in the first position when said operating member is in the first position, and permitting said change-over switch to move to the second position when said operating member is in the second position, said first interlocking means being connected to said operating member so that the first gear may be carried to its operating position when said operating member is in said first position and the second gear may be carried to its operating position when said operating member is in the second position;

a lock means for retaining said change-over switch in the first position thereof;

shutter means having a changeable aperture;

a rotatable first control member having a geared portion engageable with said first and second gears and, followed by a non-toothed portion;

second interlocking means controlling said changeable aperture of said shutter means in response to the angular position of said first control member; and a second control member having a geared portion engageable with said first and second gears and followed by a non-toothed portion, and rotatable concentrically with said first control member, between a rest position where its non-toothed portion faces said first gear and an operative position to release the lock of said switch means, said second control member when said second control member moves from the rest position to the first operative position for bringing said first control member from the aperture open position to the aperture close position, and to disengage with said control member when said second control member returns from said first operative position, the geared portion of the second control member constantly facing the second gear; the geared portion of said first control member facing to the second gear when the member is in the aperture open position and faces to the first gear when the member is in the aperture closed position, and a switch means being opened for checking the rotation of said motor in the reverse position with said second control member in said rest position.

2. In the motion picture camera as set forth in claim 1, wherein
a projection is provided on the surface of said second control member; and
a notch is formed on said first control member which engages with said projection when the second control member moves from its rest position to the operative position, and disengages therefrom when the said second control member moves from the first operative position to the second operative position.

3. A motion picture camera as set forth in claim 2, wherein the geared portion of said first control member is one half of that of said second control member in extension, and the geared portion of said first control member overlaps that of said second control member when said second control member carries said first control member, and when both of the control members are in the normal photographing positions.

4. A motion picture camera as set forth in claim 1, further comprising a second lock means being urged to engage said operating member to follow thereafter and engage said film transport means by a pawl thereof for arresting the film transport means with said operating member in the second position.

5. A motion picture camera as set forth in claim 1, further comprising:
a second operating member manually positionable to a first position for a normal speed photographing and to a second position for a high-speed photographing;
a second change-over switch actuatable by said second operating member to select voltage to be applied to said driving motor for said normal or high-speed photographing;
a third lock member interconnected with said first operating member to assume a position for blocking said second operating member from moving to the second position with said first operating member in the second position thereof.

6. A motion picture camera as set forth in claim 5, further comprising a fourth lock member being urged to follow after said second operating member and moved to a position for preventing said first operating member from being moved to said second position with said second operating member operated to said second position.

* * * * *